(12) United States Patent
Chen et al.

(10) Patent No.: US 10,673,505 B2
(45) Date of Patent: Jun. 2, 2020

(54) METHOD AND DEVICE FOR CONFIGURING CHANNEL INFORMATION, AND METHOD AND DEVICE FOR CHANNEL INFORMATION FEEDBACK

(71) Applicant: ZTE Corporation, Shenzhen (CN)

(72) Inventors: Yijian Chen, Shenzhen (CN); Yu Ngok Li, Shenzhen (CN); Huahua Xiao, Shenzhen (CN); Jian Li, Shenzhen (CN); Zhaohua Lu, Shenzhen (CN); Yuxin Wang, Shenzhen (CN); Jing Zhao, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 15/568,078

(22) PCT Filed: Jan. 4, 2016

(86) PCT No.: PCT/CN2016/070074
§ 371 (c)(1),
(2) Date: Oct. 20, 2017

(87) PCT Pub. No.: WO2016/169304
PCT Pub. Date: Oct. 27, 2016

(65) Prior Publication Data
US 2018/0145735 A1    May 24, 2018

(30) Foreign Application Priority Data

Apr. 20, 2015  (CN) .......................... 2015 1 0188098

(51) Int. Cl.
*H04B 7/06* (2006.01)
*H04L 1/00* (2006.01)
(Continued)

(52) U.S. Cl.
CPC ......... *H04B 7/0626* (2013.01); *H04B 7/0486* (2013.01); *H04B 7/0658* (2013.01);
(Continued)

(58) Field of Classification Search
None
See application file for complete search history.

(56) References Cited

U.S. PATENT DOCUMENTS

| 10,164,749 B2* | 12/2018 | Sun | ........................ H04L 5/0048 |
| 2013/0208604 A1* | 8/2013 | Lee | ....................... H04B 17/345 370/252 |

(Continued)

FOREIGN PATENT DOCUMENTS

| CN | 103716116 A | 4/2014 |
| CN | 103795491 A | 5/2014 |

(Continued)

OTHER PUBLICATIONS

International Search Report for corresponding application PCT/CN2016/070074 filed on Jan. 4, 2016; Report dated Mar. 22, 2016.
(Continued)

*Primary Examiner* — Christopher T Wyllie
(74) *Attorney, Agent, or Firm* — Cantor Colburn LLP

(57) ABSTRACT

A method and device for configuring channel information are provided. The method includes: a base station configures Q Channel State Information (CSI) measurement threads for a CSI process, wherein Q is an integer greater than or equal to 2; and the base station configures P1 channel measurement reference signals and P2 interference measurement resources for the Q CSI measurement threads, wherein the P1 channel measurement reference signals are used to perform channel measurement on the Q CSI measurement threads, and the P2 interference measurement resources are used to perform interference measurement on the Q CSI
(Continued)

A terminal acquires configuration information of Q CSI measurement threads corresponding to a CSI process — S202

The terminal performs CSI measurement and CSI feedback operations on the Q CSI measurement threads according to the P1 channel measurement reference signals and the P2 interference measurement resources, and selects Y CSI measurement threads from the Q CSI measurement threads undergoing the CSI measurement and CSI feedback operations — S204 measurement threads, P1 and P2 being integers greater than zero.

20 Claims, 2 Drawing Sheets

(51) Int. Cl.
    *H04L 5/00*           (2006.01)
    *H04B 7/0456*      (2017.01)
    *H04W 24/10*       (2009.01)
    *H04B 17/345*      (2015.01)

(52) U.S. Cl.
    CPC .............. *H04L 1/00* (2013.01); *H04L 1/0026* (2013.01); *H04L 5/0023* (2013.01); *H04L 5/0057* (2013.01); *H04W 24/10* (2013.01); *H04B 7/0456* (2013.01); *H04B 17/345* (2015.01); *H04L 5/0048* (2013.01)

(56) References Cited

U.S. PATENT DOCUMENTS

| | | | | |
|---|---|---|---|---|
| 2013/0223258 A1* | 8/2013 | Seo | ........................ | H04W 24/02 370/252 |
| 2013/0258965 A1* | 10/2013 | Geirhofer | ............. | H04L 1/0027 370/329 |
| 2013/0301432 A1* | 11/2013 | Hammarwall | ........ | H04W 24/02 370/252 |
| 2013/0303090 A1* | 11/2013 | Hammarwall | ....... | H04B 7/0456 455/67.13 |
| 2013/0329664 A1* | 12/2013 | Kim | ...................... | H04L 5/0048 370/329 |
| 2014/0022988 A1* | 1/2014 | Davydov | ............. | H04W 88/02 370/328 |
| 2014/0036796 A1* | 2/2014 | Etemad | ................... | H04L 45/28 370/329 |
| 2014/0044061 A1* | 2/2014 | Yue | ..................... | H04W 72/042 370/329 |
| 2014/0079100 A1* | 3/2014 | Kim | .................... | H04B 7/0417 375/219 |
| 2014/0177745 A1 | 6/2014 | Krishnamurthy | | |
| 2014/0248893 A1* | 9/2014 | Takahashi | ............. | H04L 1/0026 455/452.1 |
| 2014/0334391 A1 | 11/2014 | Khoshneivis | | |
| 2015/0098346 A1* | 4/2015 | Guo | ..................... | H04B 7/0478 370/252 |
| 2015/0131563 A1* | 5/2015 | Guo | ......................... | H04L 1/20 370/329 |
| 2015/0288505 A1* | 10/2015 | Park | ...................... | H04L 5/0073 370/336 |
| 2016/0249337 A1* | 8/2016 | Liang | .................. | H04W 72/042 |
| 2016/0278077 A1* | 9/2016 | Song | ....................... | H04W 8/22 |
| 2017/0170940 A1* | 6/2017 | Lee | ........................ | H04L 5/0048 |
| 2018/0145735 A1* | 5/2018 | Chen | ......................... | H04L 1/00 |

FOREIGN PATENT DOCUMENTS

| | | |
|---|---|---|
| CN | 103825663 A | 5/2014 |
| WO | 2014157940 A1 | 10/2014 |

OTHER PUBLICATIONS

European Search Report for corresponding application EP16782452: Report dated Apr. 6, 2018.

Samsung, "CSI test cases design for downlink CoMP", 3GPP Draft, vol. RAN WG4, No. Malta, 20130128-20130201, Jan. 21, 2013, XP050674803.

\* cited by examiner

METHOD AND DEVICE FOR CONFIGURING CHANNEL INFORMATION, AND METHOD AND DEVICE FOR CHANNEL INFORMATION FEEDBACK

TECHNICAL FIELD

The disclosure relates to the field of communications, and more particularly to a method and device for configuring channel information, and a method and device for channel information feedback.

BACKGROUND

According to introductions from a basic principle of a multi-antenna communication precoding and feedback technology, in a wireless communication system, a transmitting end and a receiving end acquire higher rates by using multiple antennae in a spatial multiplexing form. Compared with an ordinary spatial multiplexing method, an enhanced technology refers to that: the receiving end feeds channel information back to the transmitting end, and the transmitting end uses a transmission precoding technology according to the obtained channel information, so that the transmission performance can be greatly improved. In Single-User Multi-input Multi-output (MIMO) (SU-MIMO), channel feature vector information is directly used to perform precoding; and in Multi-User MIMO (MU-MIMO), relatively accurate channel information is needed. In a 3rd Generation Partnership Project (3GPP) Long Term Evolution (LTE), the channel information is fed back by mainly utilizing a simple single-codebook feedback method, and the performance of an MIMO transmission precoding technology more depends on the accuracy of feedback of a codebook therein.

A basic principle of codebook-based channel information quantized feedback is simply elaborated here as follows. If a limited feedback channel capacity is $B_{bps/Hz}$, the number of available code words is $N=2^B$. A feature vector space of a channel matrix is quantized to form a codebook space $\mathfrak{R}=\{F_1, F_2 \ldots F_S\}$. The transmitting end and the receiving end jointly save or generate this codebook $\mathfrak{R}$ (the same for the transmitting end and the receiving end) in real time. For each channel implementation H, the receiving end selects a code word $\hat{F}$ most matched with the channel implementation H from the codebook space $\mathfrak{R}$ according to a certain criterion, and feeds a sequence number i (code word sequence number) of the code word $\hat{F}$ back to the transmitting end. Here, the code word sequence number is referred to as a Precoding Matrix Indicator (PMI) in a codebook. The transmitting end finds the corresponding precoding code word $\hat{F}$ according to the sequence number i, so as to obtain corresponding channel information, $\hat{F}$ representing feature vector information of a channel. Herein, a channel H is generally obtained by channel measurement according to a channel measurement reference signal.

Generally speaking, the codebook space $\mathfrak{R}$ may be further divided into codebooks corresponding to a plurality of Ranks, and each Rank will correspond to a plurality of code words to quantize a precoding matrix formed by channel feature vectors under this Rank. The Rank of a channel is equal to the number of non-zero feature vectors, so that generally speaking, there will be N columns of code words when the Rank is N. Therefore, the codebook space $\mathfrak{R}$ may be divided into a plurality of sub-codebooks according to different Ranks. Table 1 is a diagram of a codebook divided into a plurality of sub-codebooks according to a Rank. As shown in Table 1:

TABLE 1

| $\mathfrak{R}$ Layer number v (Rank) | | |
|---|---|---|
| 1 | 2 | ... N |
| $\mathfrak{R}_1$ Code word vector set having column number 1 | $\mathfrak{R}_2$ Code word vector set having column number 2 | ... $\mathfrak{R}_N$ ... Code word vector set having column number N | where when Rank>1, code words needing to be stored are all in a matrix form, a codebook in an LTE protocol adopts a codebook quantized feedback method, and actually, a precoding codebook and a channel information quantized codebook in the LTE have the same meaning. Hereinafter, for the sake of unification, a vector may be regarded as a one-dimension matrix.

Feedback contents of a 3GPP protocol about Channel State Information (CSI) introduce some contents relevant to channel information feedback in the LTE. Contents concerned in the disclosure are channel Rank Indication (RI) information and PMI information, and a Channel Quality Indication (CQI) may be fed back together with a PMI. CSI feedback includes: a CQI, a PMI and an RI.

The CQI is an index for measuring the downlink channel quality. In 36-213 protocols, the CQI is expressed by integer values 0-15, which respectively represent different CQI grades, different CQIs corresponding to respective Modulation and Coding Schemes (MCS). The RI is used to describe the quantity of spatial independent channels, and corresponds to a rank of a channel response matrix. Under open-loop spatial multiplexing and closed-loop spatial multiplexing modes, a User Equipment (UE) needs to feed RI information back, and under other modes, the UE does not need to feed RI information back. The rank of the channel matrix corresponds to a layer. The PMI feeds optimum precoding information back, and on the basis of index feedback, a code word most matching the feature of a current channel in an appointed codebook is indicated.

A concept of a CSI process is also introduced into the 3GPP, a base station may configure a plurality of CSI processes for a terminal, each CSI process is equivalent to a feedback process, and all CSI processes are independent of each other, and can perform parameter configuration respectively.

A CSI process includes configuration of a channel measurement part, and configuration of an interference measurement part and a feedback mode. The channel measurement part generally specifies a set of non-zero power CSI-RS for channel measurement, the interference measurement part generally specifies a set of IMR resource configurations for interference measurement, and IMR resources may generally be a set of zero power CSI-RS.

In the related art, a reference signal is a full-dimension reference signal generally by default, namely a physical antenna and a measurement reference signal port are one-to-one mapping, a channel measurement method is relatively simple, and a CSI quantized feedback technology based on an RI/PMI/CQI implicit feedback method is also relatively single.

With the development of an MIMO technology, a great number of new technologies, e.g., a measurement technology based on a precoding CSI-RS reference signal and a new feedback technology such as a horizontal/vertical fractional dimension feedback technology, emerge. Although some new technologies have good performances under some scenarios, performance losses will be brought under some scenarios. Therefore, it becomes very important to be able to quite flexibly perform various measurements and feedbacks, so good performance can be guaranteed, and meanwhile, good measurement and feedback robustness can be guaranteed.

At present, any effective solution has not been proposed yet for the problem that in the related art the reference signal measurement and feedback technologies are not flexible.

SUMMARY

A main objective of the embodiments of the disclosure is to provide a method and device for configuring channel information, and for channel information feedback, which are used to at least solve the problem that in the related art the reference signal measurement and feedback technologies are not flexible.

According to one aspect of the embodiments of the disclosure, a method for configuring channel information is provided. The method includes: a base station configures Q CSI measurement threads for a CSI process, and Q is an integer greater than or equal to 2; and the base station configures P1 channel measurement reference signals and P2 interference measurement resources for the Q CSI measurement threads, and the P1 channel measurement reference signals are used to perform channel measurement on the Q CSI measurement threads, and the P2 interference measurement resources are used to perform interference measurement on the Q CSI measurement threads, P1 and P2 being integers greater than zero.

In an embodiment, channel measurement reference signals corresponding to the Q CSI measurement threads are the same, and interference measurement resources corresponding to at least two CSI measurement threads in the Q CSI measurement threads are different.

In an embodiment, interference resource measurement reference signals corresponding to the Q CSI measurement threads are the same, and interference measurement resources corresponding to at least two CSI measurement threads in the Q CSI measurement threads are different.

In an embodiment, at least two different types of reference signals exist in the channel measurement reference signals corresponding to the Q CSI measurement threads.

In an embodiment, the method includes: the base station configures a CSI quantization and/or feedback method for the Q CSI measurement threads.

In an embodiment, the step that the base station configures a CSI quantization and/or feedback method for the Q CSI measurement threads includes: the base station configures a channel RANK or LAYER calculation method for the Q CSI measurement threads; and/or, the base station configures an RI calculation method for the Q CSI measurement threads; and/or, the base station configures a used codebook quantization method for the Q CSI measurement threads; and/or, the base station configures a CSI feedback mode for the Q CSI measurement threads.

In an embodiment, at least X CSI measurement threads in the Q CSI measurement threads are used for channel information feedback of X RANK or LAYER groups respectively.

In an embodiment, when X is 2, a RANK or LAYER group 1 is RANK or LAYER={1, 2}, and a RANK or LAYER group 2 is RANK or LAYER={3, 4}; or, a RANK or LAYER group 1 is RANK or LAYER={1, 2}, and a RANK or LAYER group 2 is RANK or LAYER={1, 2, 3, 4}; or, a RANK or LAYER group 1 is RANK or LAYER={1, 2}, and a RANK or LAYER group 2 is RANK or LAYER={3-8}; or, a RANK or LAYER group 1 is RANK or LAYER={1-4}, and a RANK or LAYER group 2 is RANK or LAYER={5-8}; or, a RANK or LAYER group 1 is RANK or LAYER={1-4}, and a RANK or LAYER group 2 is RANK or LAYER={1-8}; or, a RANK or LAYER group 1 is RANK or LAYER={1}, and a RANK or LAYER group 2 is RANK or LAYER={2} or RANK or LAYER={2-4} or {2-8} or {1-2} or {1-4} or {1-8};

In the case of that X is 3:
a RANK or LAYER group 1 is RANK or LAYER={1, 2}, a RANK or LAYER group 2 is RANK or LAYER={3, 4}, and a RANK or LAYER group 3 is RANK or LAYER={5-8}; or, a RANK or LAYER group 1 is RANK or LAYER={1, 2}, a RANK or LAYER group 2 is RANK or LAYER={1-4}, and a RANK or LAYER group 3 is RANK or LAYER={1-8}; or, a RANK or LAYER group 1 is RANK or LAYER={1}, a RANK or LAYER group 2 is {2}, and a RANK or LAYER group 2 is {3, 4}; or, a RANK or LAYER group 1 is RANK or LAYER={1}, a RANK or LAYER group 2 is {2}, and a RANK or LAYER group 2 is {3-8}; or, a RANK or LAYER group 1 is RANK or LAYER={1}, a RANK or LAYER group 2 is {2-4}, and a RANK or LAYER group 2 is {5, 8}.

According to another aspect of the disclosure, a method for configuring channel information is provided. The method includes: a base station configures P1 channel measurement reference signals and P2 interference measurement resources for a CSI process, and the P1 channel measurement reference signals are used to perform channel measurement on Q CSI measurement threads, and the P2 interference measurement resources are used to perform interference measurement on the Q CSI measurement threads, P1 and P2 being integers greater than zero, and at least one of P1 and P2 being greater than 1.

According to a further aspect of the embodiments of the disclosure, a channel information feedback method is provided. The method includes: a terminal acquires configuration information of Q CSI measurement threads corresponding to a CSI process, and the configuration information includes: P1 channel measurement reference signals and P2 interference measurement resources, the P1 channel measurement reference signals are used to perform channel measurement on the Q CSI measurement threads, and the P2 interference measurement resources are used to perform interference measurement on the Q CSI measurement threads, P1 and P2 being integers greater than zero; and the terminal executes CSI measurement and CSI feedback operations on the Q CSI measurement threads according to the P1 channel measurement reference signals and the P2 interference measurement resources, and selects Y CSI measurement threads from the Q CSI measurement threads undergoing the CSI measurement and CSI feedback operations.

In an embodiment, channel measurement reference signals corresponding to the Q CSI measurement threads are the same, and interference measurement resources corresponding to at least two CSI measurement threads in the Q CSI measurement threads are different.

In an embodiment, interference resource measurement reference signals corresponding to the Q CSI measurement threads are the same, and interference measurement resources corresponding to at least two CSI measurement threads in the Q CSI measurement threads are different.

In an embodiment, at least two different types of reference signals exist in the channel measurement reference signals corresponding to the Q CSI measurement threads.

In an embodiment, the configuration information is further used to instruct a base station to configure a CSI quantization and/or feedback method for the Q CSI measurement threads.

In an embodiment, the CSI quantization and/or feedback method includes at least one of the following: a channel RANK or LAYER calculation method; an RI calculation method; a used codebook quantization method; and a CSI feedback mode.

In an embodiment, at least X CSI measurement threads in the Q CSI measurement threads are used for channel information feedback of X RANK or LAYER groups respectively.

In an embodiment, when X is 2:
a RANK or LAYER group 1 is RANK={1, 2} or LAYER={1, 2}, and a RANK or LAYER group 2 is RANK or LAYER={3, 4}; or, a RANK or LAYER group 1 is RANK or LAYER={1, 2}, and a RANK or LAYER group 2 is RANK or LAYER={1, 2, 3, 4}; or, a RANK or LAYER group 1 is RANK or LAYER={1, 2}, and a RANK or LAYER group 2 is RANK or LAYER={3-8}; or, a RANK or LAYER group 1 is RANK or LAYER={1-4}, and a RANK or LAYER group 2 is RANK or LAYER={5-8}; or, a RANK or LAYER group 1 is RANK or LAYER={1-4}, and a RANK or LAYER group 2 is RANK or LAYER={1-8}; or, a RANK or LAYER group 1 is RANK or LAYER={1}, and a RANK or LAYER group 2 is RANK or LAYER={2} or RANK or LAYER={2-4} or {2-8} or {1-2} or {1-4} or {1-8};

when X is 3:
a RANK or LAYER group 1 is RANK or LAYER={1, 2}, a RANK or LAYER group 2 is RANK or LAYER={3, 4}, and a RANK or LAYER group 3 is RANK or LAYER={5-8}; or, a RANK or LAYER group 1 is RANK or LAYER={1, 2}, a RANK or LAYER group 2 is RANK or LAYER={1-4}, and a RANK or LAYER group 3 is RANK or LAYER={1-8}; or, a RANK or LAYER group 1 is RANK or LAYER={1}, a RANK or LAYER group 2 is {2}, and a RANK or LAYER group 2 is {3, 4}; or, a RANK or LAYER group 1 is RANK or LAYER={1}, a RANK or LAYER group 2 is {2}, and a RANK or LAYER group 2 is {3-8}; or, a RANK or LAYER group 1 is RANK or LAYER={1}, a RANK or LAYER group 2 is {2-4}, and a RANK or LAYER group 2 is {5, 8}.

According to a further aspect of the embodiments of the disclosure, a device for configuring channel information is provided. The device is located at a base station, and includes: a first configuration module, configured to configure Q CSI measurement threads for a CSI process, and Q is an integer greater than or equal to 2; and a second configuration module, configured to configure P1 channel measurement reference signals and P2 interference measurement resources for the Q CSI measurement threads, and the P1 channel measurement reference signals are used to perform channel measurement on the Q CSI measurement threads, and the P2 interference measurement resources are used to perform interference measurement on the Q CSI measurement threads, P1 and P2 being integers greater than zero.

In an embodiment, channel measurement reference signals corresponding to the Q CSI measurement threads are the same, and interference measurement resources corresponding to at least two CSI measurement threads in the Q CSI measurement threads are different.

In an embodiment, interference resource measurement reference signals corresponding to the Q CSI measurement threads are the same, and interference measurement resources corresponding to at least two CSI measurement threads in the Q CSI measurement threads are different.

In an embodiment, at least two different types of reference signals exist in the channel measurement reference signals corresponding to the Q CSI measurement threads.

In an embodiment, the device includes: a third configuration module, configured to configure a CSI quantization and/or feedback method for the Q CSI measurement threads.

In an embodiment, the third configuration module is further configured to: configure, by the base station, a channel RANK or LAYER calculation method for the Q CSI measurement threads; and/or, configure an RI calculation method for the Q CSI measurement threads; and/or, configure a used codebook quantization method for the Q CSI measurement threads; and/or, configure a CSI feedback mode for the Q CSI measurement threads.

In an embodiment, at least X CSI measurement threads in the Q CSI measurement threads are used for channel information feedback of X RANK or LAYER groups respectively.

In an embodiment, when X is 2:
a RANK or LAYER group 1 is RANK={1, 2} or LAYER={1, 2}, and a RANK or LAYER group 2 is RANK or LAYER={3, 4}; or, a RANK or LAYER group 1 is RANK or LAYER={1, 2}, and a RANK or LAYER group 2 is RANK or LAYER={1, 2, 3, 4}; or, a RANK or LAYER group 1 is RANK or LAYER={1, 2}, and a RANK or LAYER group 2 is RANK or LAYER={3-8}; or, a RANK or LAYER group 1 is RANK or LAYER={1-4}, and a RANK or LAYER group 2 is RANK or LAYER={5-8}; or, a RANK or LAYER group 1 is RANK or LAYER={1-4}, and a RANK or LAYER group 2 is RANK or LAYER={1-8}; or, a RANK or LAYER group 1 is RANK or LAYER={1}, and a RANK or LAYER group 2 is RANK or LAYER={2} or RANK or LAYER={2-4} or {2-8} or {1-2} or {1-4} or {1-8};

when X is 3:
a RANK or LAYER group 1 is RANK or LAYER={1, 2}, a RANK or LAYER group 2 is RANK or LAYER={3, 4}, and a RANK or LAYER group 3 is RANK or LAYER={5-8}; or, a RANK or LAYER group 1 is RANK or LAYER={1, 2}, a RANK or LAYER group 2 is RANK or LAYER={1-4}, and a RANK or LAYER group 3 is RANK or LAYER={1-8}; or, a RANK or LAYER group 1 is RANK or LAYER={1}, a RANK or LAYER group 2 is {2}, and a RANK or LAYER group 2 is {3, 4}; or, a RANK or LAYER group 1 is RANK or LAYER={1}, a RANK or LAYER group 2 is {2}, and a RANK or LAYER group 2 is {3-8}; or, a RANK or LAYER group 1 is RANK or LAYER={1}, a RANK or LAYER group 2 is {2-4}, and a RANK or LAYER group 2 is {5, 8}.

According to a further aspect of the disclosure, a device for configuring channel information is provided. The device is located at a base station, and includes: a fourth configuration module, configured to configure P1 channel measurement reference signals and P2 interference measurement resources for a CSI process, and the P1 channel measurement reference signals are used to perform channel measurement on Q CSI measurement threads, and the P2 interference measurement resources are used to perform interference measurement on the Q CSI measurement threads, P1 and P2 being integers greater than zero, and at least one of P1 and P2 being greater than 1.

According to a further aspect of the embodiments of the disclosure, a channel information feedback device is provided. The device is located at a terminal, and includes: an acquisition module, configured to acquire configuration information of Q CSI measurement threads corresponding to a CSI process, and the configuration information includes: P1 channel measurement reference signals and P2 interference measurement resources, the P1 channel measurement reference signals are used to perform channel measurement on the Q CSI measurement threads, and the P2 interference measurement resources are used to perform interference measurement on the Q CSI measurement threads, P1 and P2 being integers greater than zero; and a selection module, configured to execute, by the terminal, CSI measurement and CSI feedback operations on the Q CSI measurement threads according to the P1 channel measurement reference signals and the P2 interference measurement resources, and select Y CSI measurement threads from the Q CSI measurement threads undergoing the CSI measurement and CSI feedback operations.

In an embodiment, channel measurement reference signals corresponding to the Q CSI measurement threads are the same, and interference measurement resources corresponding to at least two CSI measurement threads in the Q CSI measurement threads are different.

In an embodiment, interference resource measurement reference signals corresponding to the Q CSI measurement threads are the same, and interference measurement resources corresponding to at least two CSI measurement threads in the Q CSI measurement threads are different.

In an embodiment, at least two different types of reference signals exist in the channel measurement reference signals corresponding to the Q CSI measurement threads.

In an embodiment, the configuration information further includes: a CSI quantization and/or feedback method.

In an embodiment, the CSI quantization and/or feedback method includes at least one of the following: a channel RANK or LAYER calculation method; an RI calculation method; a used codebook quantization method; and a CSI feedback mode.

In an embodiment, at least X CSI measurement threads in the Q CSI measurement threads are used for channel information feedback of X RANK or LAYER groups respectively.

In an embodiment, when X is 2:
a RANK or LAYER group 1 is RANK={1, 2} or LAYER={1, 2}, and a RANK or LAYER group 2 is RANK or LAYER={3, 4}; or, a RANK or LAYER group 1 is RANK or LAYER={1, 2}, and a RANK or LAYER group 2 is RANK or LAYER={1, 2, 3, 4}; or, a RANK or LAYER group 1 is RANK or LAYER={1, 2}, and a RANK or LAYER group 2 is RANK or LAYER={3-8}; or, a RANK or LAYER group 1 is RANK or LAYER={1-4}, and a RANK or LAYER group 2 is RANK or LAYER={5-8}; or, a RANK or LAYER group 1 is RANK or LAYER={1-4}, and a RANK or LAYER group 2 is RANK or LAYER={1-8}; or, a RANK or LAYER group 1 is RANK or LAYER={1}, and a RANK or LAYER group 2 is RANK or LAYER={2} or RANK or LAYER={2-4} or {2-8} or {1-2} or {1-4} or {1-8};

when X is 3,
a RANK or LAYER group 1 is RANK or LAYER={1, 2}, a RANK or LAYER group 2 is RANK or LAYER={3, 4}, and a RANK or LAYER group 3 is RANK or LAYER={5-8}; or, a RANK or LAYER group 1 is RANK or LAYER={1, 2}, a RANK or LAYER group 2 is RANK or LAYER={1-4}, and a RANK or LAYER group 3 is RANK or LAYER={1-8}; or, a RANK or LAYER group 1 is RANK or LAYER={1}, a RANK or LAYER group 2 is {2}, and a RANK or LAYER group 2 is {3, 4}; or, a RANK or LAYER group 1 is RANK or LAYER={1}, a RANK or LAYER group 2 is {2}, and a RANK or LAYER group 2 is {3-8}; or, a RANK or LAYER group 1 is RANK or LAYER={1}, a RANK or LAYER group 2 is {2-4}, and a RANK or LAYER group 2 is {5, 8}.

By means of the embodiments of the disclosure, a mode of configuring Q CSI measurement threads for a CSI process and also configuring, by a base station, P1 channel measurement reference signals and P2 interference measurement resources for the Q CSI measurement threads is adopted. That is, various pieces of channel information can be measured by configuring multiple threads and configuring channel measurement reference signals and interference measurement resources for the multiple threads, thereby solving the problem in the related art where reference signal measurement and feedback technologies are not flexible.

BRIEF DESCRIPTION OF THE DRAWINGS

The drawings illustrated herein are used to provide a further understanding for the disclosure, and form a part of the present application. The schematic embodiments and illustrations of the disclosure are used to explain the disclosure.

DETAILED DESCRIPTION OF THE EMBODIMENTS

It is important to note that the embodiments in the present application and the features in the embodiments can be combined under the condition of no conflicts. The disclosure will be illustrated hereinbelow with reference to the drawings and in conjunction with embodiments in detail.

Figure 1:
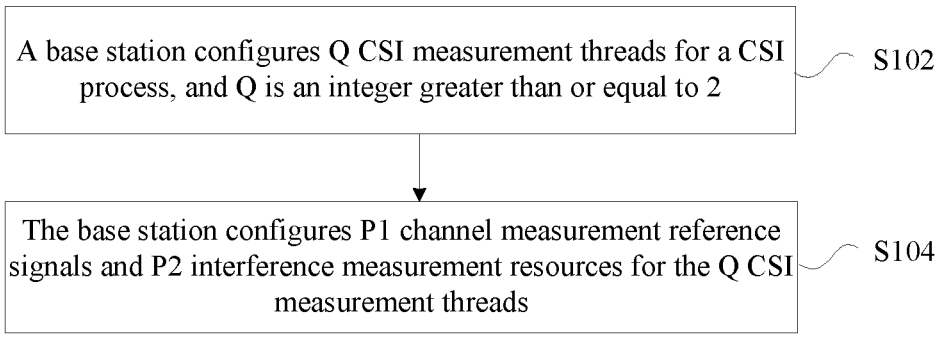
FIG. 1 is a flowchart of a method for configuring channel information according to an embodiment of the disclosure.

The present embodiment provides a method for configuring channel information. FIG. 1 is a flowchart of a method for configuring channel information according to an embodiment of the disclosure. As shown in FIG. 1, the method includes the steps as follows.

In Step S102, a base station configures Q CSI measurement threads for a CSI process, and Q is an integer greater than or equal to 2.

In Step S104, the base station configures P1 channel measurement reference signals and P2 interference measurement resources for the Q CSI measurement threads, and the P1 channel measurement reference signals are used to perform channel measurement on the Q CSI measurement threads, and the P2 interference measurement resources are used to perform interference measurement on the Q CSI measurement threads, P1 and P2 being integers greater than zero.

By means of Step S102 to Step S104 in the present embodiment, a mode of configuring Q CSI measurement threads for a CSI process and also configuring, by a base station, P1 channel measurement reference signals and P2 interference measurement resources for the Q CSI measurement threads is adopted. That is, various pieces of channel information can be measured by configuring multiple threads and configuring channel measurement reference signals and interference measurement resources for the multiple threads, thereby solving the problem in the related art where reference signal measurement and feedback technologies are not flexible.

In an embodiment, on the basis of channel measurement reference signals and interference measurement resources in the present embodiment, Q CSI measurement threads correspond to the channel measurement reference signals and the interference measurement resources in an alternative implementation manner of the present embodiment as follows:

manner 1: channel measurement reference signals corresponding to the Q CSI measurement threads are the same, and interference measurement resources corresponding to at least two CSI measurement threads in the Q CSI measurement threads are different;

manner 2: interference resource measurement reference signals corresponding to the Q CSI measurement threads are the same, and interference measurement resources corresponding to at least two CSI measurement threads in the Q CSI measurement threads are different; and manner 3: at least two different types of reference signals exist in the channel measurement reference signals corresponding to the Q CSI measurement threads.

For the manners in the present embodiment, in another alternative implementation manner of the present embodiment, the manners in the present embodiment may further include the following method step: the base station configures a CSI quantization and/or feedback method for the Q CSI measurement threads.

In an application scenario of the present embodiment, the step that the base station configures a CSI quantization and/or feedback method for the Q CSI measurement threads includes at least one of the following configuration operations:

configuration operation 1: the base station configures a channel RANK or LAYER calculation method for the Q CSI measurement threads;

configuration operation 2: the base station configures an RI calculation method for the Q CSI measurement threads; and/or, configuration operation 3: the base station configures a used codebook quantization method for the Q CSI measurement threads; and configuration operation 4: the base station configures a CSI feedback mode for the Q CSI measurement threads.

For the above configuration operations, at least X CSI measurement threads in the Q CSI measurement threads are used for channel information feedback of X RANK or LAYER groups respectively.

For example, when X is 2:

a RANK or LAYER group 1 is RANK={1, 2} or LAYER={1, 2}, and a RANK or LAYER group 2 is RANK or LAYER={3, 4}; or, a RANK or LAYER group 1 is RANK or LAYER={1, 2}, and a RANK or LAYER group 2 is RANK or LAYER={1, 2, 3, 4}; or, a RANK or LAYER group 1 is RANK or LAYER={1, 2}, and a RANK or LAYER group 2 is RANK or LAYER={3-8}; or, a RANK or LAYER group 1 is RANK or LAYER={1-4}, and a RANK or LAYER group 2 is RANK or LAYER={5-8}; or, a RANK or LAYER group 1 is RANK or LAYER={1-4}, and a RANK or LAYER group 2 is RANK or LAYER={1-8}; or, a RANK or LAYER group 1 is RANK or LAYER={1}, and a RANK or LAYER group 2 is RANK or LAYER={2} or RANK or LAYER={2-4} or {2-8} or {1-2} or {1-4} or {1-8};

when X is 3:

a RANK or LAYER group 1 is RANK or LAYER={1, 2}, a RANK or LAYER group 2 is RANK or LAYER={3, 4}, and a RANK or LAYER group 3 is RANK or LAYER={5-8}; or, a RANK or LAYER group 1 is RANK or LAYER={1, 2}, a RANK or LAYER group 2 is RANK or LAYER={1-4}, and a RANK or LAYER group 3 is RANK or LAYER={1-8}; or, a RANK or LAYER group 1 is RANK or LAYER={1}, a RANK or LAYER group 2 is {2}, and a RANK or LAYER group 2 is {3, 4}; or, a RANK or LAYER group 1 is RANK or LAYER={1}, a RANK or LAYER group 2 is {2}, and a RANK or LAYER group 2 is {3-8}; or, a RANK or LAYER group 1 is RANK or LAYER={1}, a RANK or LAYER group 2 is {2-4}, and a RANK or LAYER group 2 is {5, 8}.

In addition, the present embodiment also provides a method for configuring channel information. The method includes: a base station configures P1 channel measurement reference signals and P2 interference measurement resources for a CSI process, and the P1 channel measurement reference signals are used to perform channel measurement on Q CSI measurement threads, and the P2 interference measurement resources are used to perform interference measurement on the Q CSI measurement threads, P1 and P2 being integers greater than zero, and at least one of P1 and P2 being greater than 1.

By means of the above manner, in the configuration method, a base station may directly configure P1 channel measurement reference signals and P2 interference measurement resources for a CSI process. That is, various pieces of channel information can be measured by configuring channel measurement reference signals and interference measurement resources for a CSI process, and the problem in the related art where reference signal measurement and feedback technologies are not flexible is also solved.

Figure 2:
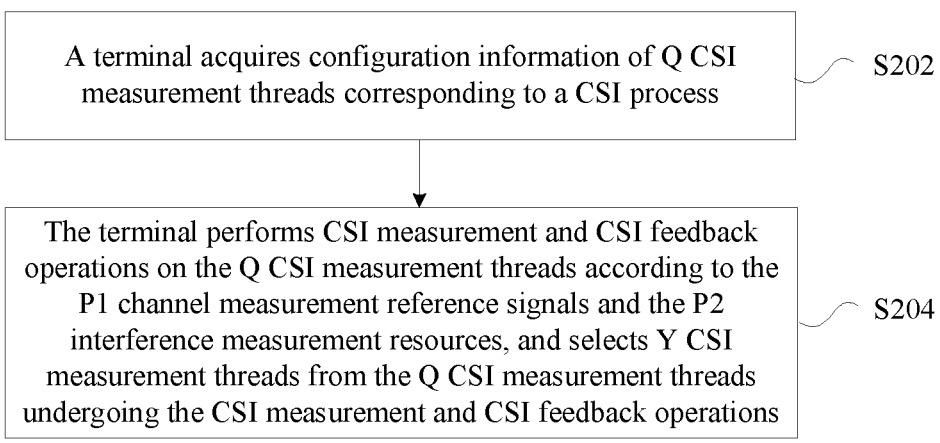
FIG. 2 is a flowchart of a channel information feedback method according to an embodiment of the disclosure.

FIG. 2 is a flowchart of a channel information feedback method according to an embodiment of the disclosure. As shown in FIG. 2, the method includes the steps as follows.

In Step S202, a terminal acquires configuration information of Q CSI measurement threads corresponding to a CSI process, the configuration information includes: P1 channel measurement reference signals and P2 interference measurement resources, the P1 channel measurement reference signals are used to perform channel measurement on the Q CSI measurement threads, and the P2 interference measurement resources are used to perform interference measurement on the Q CSI measurement threads, P1 and P2 being integers greater than zero.

In Step S204, the terminal executes CSI measurement and CSI feedback operations on the Q CSI measurement threads according to the P1 channel measurement reference signals and the P2 interference measurement resources, and selects Y CSI measurement threads from the Q CSI measurement threads undergoing the CSI measurement and CSI feedback operations.

By means of Step S202 and Step S204, the terminal can be good in feedback flexibility, thereby avoiding the problems of bad robustness and poor performance during a single thread.

In an embodiment, on the basis of channel measurement reference signals and interference measurement resources in the present embodiment, Q CSI measurement threads correspond to the channel measurement reference signals and the interference measurement resources in an alternative implementation manner of the present embodiment as follows:

manner 1: channel measurement reference signals corresponding to the Q CSI measurement threads are the same, and interference measurement resources corresponding to at least two CSI measurement threads in the Q CSI measurement threads are different;

manner 2: interference resource measurement reference signals corresponding to the Q CSI measurement threads are the same, and interference measurement resources corresponding to at least two CSI measurement threads in the Q CSI measurement threads are different; and manner 3: at least two different types of reference signals exist in the channel measurement reference signals corresponding to the Q CSI measurement threads.

In an embodiment, configuration operations involved in the present embodiment may further include: a base station configures a CSI quantization and/or feedback method for the Q CSI measurement threads, and the CSI quantization and/or feedback method includes at least one of the following: a channel RANK or LAYER calculation method; an RI calculation method; a used codebook quantization method; and a CSI feedback mode.

For the above configuration operations, at least X CSI measurement threads in the Q CSI measurement threads are used for channel information feedback of X RANK or LAYER groups respectively.

For example, when X is 2:

a RANK or LAYER group 1 is RANK={1, 2} or LAYER={1, 2}, and a RANK or LAYER group 2 is RANK or LAYER={3, 4}; or, a RANK or LAYER group 1 is RANK or LAYER={1, 2}, and a RANK or LAYER group 2 is RANK or LAYER={1, 2, 3, 4}; or, a RANK or LAYER group 1 is RANK or LAYER={1, 2}, and a RANK or LAYER group 2 is RANK or LAYER={3-8}; or, a RANK or LAYER group 1 is RANK or LAYER={1-4}, and a RANK or LAYER group 2 is RANK or LAYER={5-8}; or, a RANK or LAYER group 1 is RANK or LAYER={1-4}, and a RANK or LAYER group 2 is RANK or LAYER={1-8}; or, a RANK or LAYER group 1 is RANK or LAYER={1}, and a RANK or LAYER group 2 is RANK or LAYER={2} or RANK or LAYER={2-4} or {2-8} or {1-2} or {1-4} or {1-8};

when X is 3, a RANK or LAYER group 1 is RANK or LAYER={1, 2}, a RANK or LAYER group 2 is RANK or LAYER={3, 4}, and a RANK or LAYER group 3 is RANK or LAYER={5-8}; or, a RANK or LAYER group 1 is RANK or LAYER={1, 2}, a RANK or LAYER group 2 is RANK or LAYER={1-4}, and a RANK or LAYER group 3 is RANK or LAYER={1-8}; or, a RANK or LAYER group 1 is RANK or LAYER={1}, a RANK or LAYER group 2 is {2}, and a RANK or LAYER group 2 is {3, 4}; or, a RANK or LAYER group 1 is RANK or LAYER={1}, a RANK or LAYER group 2 is {2}, and a RANK or LAYER group 2 is {3-8}; or, a RANK or LAYER group 1 is RANK or LAYER={1}, a RANK or LAYER group 2 is {2-4}, and a RANK or LAYER group 2 is {5, 8}.

In the present embodiment, a device for configuring channel information and a device for channel information feedback are also provided. The device is used to implement the abovementioned embodiment and preferable implementation manner. Those which have been illustrated will not be elaborated herein. Just as a term 'module' used below, the combination of software and/or hardware with predetermined functions may be implemented. Although the device described by the following embodiment is better implemented by software, the implementation of hardware or the combination of software and hardware may be possible and conceived.

Figure 3:
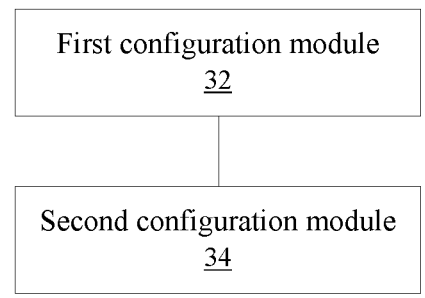
FIG. 3 is a block diagram of a device for configuring channel information according to an embodiment of the disclosure.

FIG. 3 is a block diagram of a device for configuring channel information according to an embodiment of the disclosure. The device is located at a base station. As shown in FIG. 3, the device includes: a first configuration module 32, configured to configure Q CSI measurement threads for a CSI process, and Q is an integer greater than or equal to 2; and a second configuration module 34, coupled to the first configuration module, and configured to configure P1 channel measurement reference signals and P2 interference measurement resources for the Q CSI measurement threads, and the P1 channel measurement reference signals are used to perform channel measurement on the Q CSI measurement threads, and the P2 interference measurement resources are used to perform interference measurement on the Q CSI measurement threads, P1 and P2 being integers greater than zero.

It is important to note that in the device, the first configuration module 32 may be further configured to configure P1 channel measurement reference signals and P2 interference measurement resources for a CSI process, and the P1 channel measurement reference signals are used to perform channel measurement on Q CSI measurement threads, and the P2 interference measurement resources are used to perform interference measurement on the Q CSI measurement threads, P1 and P2 being integers greater than zero, and at least one of P1 and P2 being greater than 1.

That is, the first configuration module 32 may directly configure P1 channel measurement reference signals and P2 interference measurement resources for a CSI process, and the problem in the related art where reference signal measurement and feedback technologies are not flexible can also be solved.

In an embodiment, on the basis of channel measurement reference signals and interference measurement resources in the present embodiment, Q CSI measurement threads correspond to the channel measurement reference signals and the interference measurement resources in an alternative implementation manner of the present embodiment as follows:

manner 1: channel measurement reference signals corresponding to the Q CSI measurement threads are the same, and interference measurement resources corresponding to at least two CSI measurement threads in the Q CSI measurement threads are different;

manner 2: interference resource measurement reference signals corresponding to the Q CSI measurement threads are the same, and interference measurement resources corresponding to at least two CSI measurement threads in the Q CSI measurement threads are different; and manner 3: at least two different types of reference signals exist in the channel measurement reference signals corresponding to the Q CSI measurement threads.

In an embodiment, the device in the present embodiment may further include: a third configuration module, configured to configure a CSI quantization and/or feedback method for the Q CSI measurement threads.

Herein, the third configuration module is further configured to: configure, by the base station, a channel RANK or LAYER calculation method for the Q CSI measurement threads; and/or, configure an RI calculation method for the Q CSI measurement threads; and/or, configure a used codebook quantization method for the Q CSI measurement threads; and/or, configure a CSI feedback mode for the Q CSI measurement threads.

At least X CSI measurement threads exist in the Q CSI measurement threads involved in the present embodiment and are used for channel information feedback of X RANK or LAYER groups respectively.

For example, when X is 2:

a RANK or LAYER group 1 is RANK={1, 2} or LAYER={1, 2}, and a RANK or LAYER group 2 is RANK or LAYER={3, 4}; or, a RANK or LAYER group 1 is RANK or LAYER={1, 2}, and a RANK or LAYER group 2 is RANK or LAYER={1, 2, 3, 4}; or, a RANK or LAYER group 1 is RANK or LAYER={1, 2}, and a RANK or LAYER group 2 is RANK or LAYER={3-8}; or, a RANK or LAYER group 1 is RANK or LAYER={1-4}, and a RANK or LAYER group 2 is RANK or LAYER={5-8}; or, a RANK or LAYER group 1 is RANK or LAYER={1-4}, and a RANK or LAYER group 2 is RANK or LAYER={1-8}; or, a RANK or LAYER group 1 is RANK or LAYER={1}, and a RANK or LAYER group 2 is RANK or LAYER={2} or RANK or LAYER={2-4} or {2-8} or {1-2} or {1-4} or {1-8};

when X is 3:

a RANK or LAYER group 1 is RANK or LAYER={1, 2}, a RANK or LAYER group 2 is RANK or LAYER={3, 4}, and a RANK or LAYER group 3 is RANK or LAYER={5-8}; or, a RANK or LAYER group 1 is RANK or LAYER={1, 2}, a RANK or LAYER group 2 is RANK or LAYER={1-4}, and a RANK or LAYER group 3 is RANK or LAYER={1-8}; or, a RANK or LAYER group 1 is RANK or LAYER={1}, a RANK or LAYER group 2 is {2}, and a RANK or LAYER group 2 is {3, 4}; or, a RANK or LAYER group 1 is RANK or LAYER={1}, a RANK or LAYER group 2 is {2}, and a RANK or LAYER group 2 is {3-8}; or, a RANK or LAYER group 1 is RANK or LAYER={1}, a RANK or LAYER group 2 is {2-4}, and a RANK or LAYER group 2 is {5, 8}.

Figure 4:
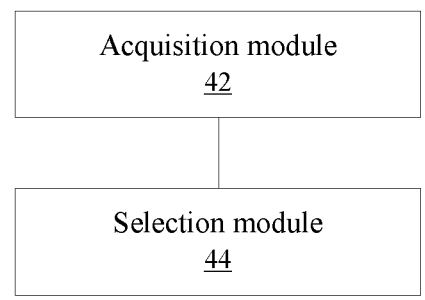
FIG. 4 is a block diagram of a channel information feedback device according to an embodiment of the disclosure.

FIG. 4 is a block diagram of a channel information feedback device according to an embodiment of the disclosure. The device is located at a terminal. As shown in FIG. 4, the device includes: an acquisition module 42, configured to acquire configuration information of Q CSI measurement threads corresponding to a CSI process, and the configuration information includes: P1 channel measurement reference signals and P2 interference measurement resources, the P1 channel measurement reference signals are used to perform channel measurement on the Q CSI measurement threads, and the P2 interference measurement resources are used to perform interference measurement on the Q CSI measurement threads, P1 and P2 being integers greater than zero; and a selection module 44, coupled to the acquisition module 42, and configured to execute, by the terminal, CSI measurement and CSI feedback operations on the Q CSI measurement threads according to the P1 channel measurement reference signals and the P2 interference measurement resources, and select Y CSI measurement threads from the Q CSI measurement threads undergoing the CSI measurement and CSI feedback operations.

In an embodiment, on the basis of channel measurement reference signals and interference measurement resources in the present embodiment, Q CSI measurement threads correspond to the channel measurement reference signals and the interference measurement resources in an alternative implementation manner of the present embodiment as follows:

manner 1: channel measurement reference signals corresponding to the Q CSI measurement threads are the same, and interference measurement resources corresponding to at least two CSI measurement threads in the Q CSI measurement threads are different;

manner 2: interference resource measurement reference signals corresponding to the Q CSI measurement threads are the same, and interference measurement resources corresponding to at least two CSI measurement threads in the Q CSI measurement threads are different; and manner 3: at least two different types of reference signals exist in the channel measurement reference signals corresponding to the Q CSI measurement threads.

In an embodiment, configuration operations further include: a base station configures a CSI quantization and/or feedback method for the Q CSI measurement threads, and the CSI quantization and/or feedback method includes at least one of the following: a channel RANK or LAYER calculation method; an RI calculation method; a used codebook quantization method; and a CSI feedback mode.

At least X CSI measurement threads exist in the Q CSI measurement threads involved in the present embodiment and are used for channel information feedback of X RANK or LAYER groups respectively.

For example, when X is 2:

a RANK or LAYER group 1 is RANK={1, 2} or LAYER={1, 2}, and a RANK or LAYER group 2 is RANK or LAYER={3, 4}; or, a RANK or LAYER group 1 is RANK or LAYER={1, 2}, and a RANK or LAYER group 2 is RANK or LAYER={1, 2, 3, 4}; or, a RANK or LAYER group 1 is RANK or LAYER={1, 2}, and a RANK or LAYER group 2 is RANK or LAYER={3-8}; or, a RANK or LAYER group 1 is RANK or LAYER={1-4}, and a RANK or LAYER group 2 is RANK or LAYER={5-8}; or, a RANK or LAYER group 1 is RANK or LAYER={1-4}, and a RANK or LAYER group 2 is RANK or LAYER={1-8}; or, a RANK or LAYER group 1 is RANK or LAYER={1}, and a RANK or LAYER group 2 is RANK or LAYER={2} or RANK or LAYER={2-4} or {2-8} or {1-2} or {1-4} or {1-8};

when X is 3:

a RANK or LAYER group 1 is RANK or LAYER={1, 2}, a RANK or LAYER group 2 is RANK or LAYER={3, 4}, and a RANK or LAYER group 3 is RANK or LAYER={5-8}; or, a RANK or LAYER group 1 is RANK or LAYER={1, 2}, a RANK or LAYER group 2 is RANK or LAYER={1-4}, and a RANK or LAYER group 3 is RANK or LAYER={1-8}; or, a RANK or LAYER group 1 is RANK or LAYER={1}, a RANK or LAYER group 2 is {2}, and a RANK or LAYER group 2 is {3, 4}; or, a RANK or LAYER group 1 is RANK or LAYER={1}, a RANK or LAYER group 2 is {2}, and a RANK or LAYER group 2 is {3-8}; or, a RANK or LAYER group 1 is RANK or LAYER={1}, a RANK or LAYER group 2 is {2-4}, and a RANK or LAYER group 2 is {5, 8}.

The disclosure is illustrated with alternative embodiments of the disclosure hereinbelow.

The technical solution adopted at a base station in the present alternative embodiment includes the steps as follows.

In Step S302, a base station configures Q CSI measurement threads for a CSI process, and Q>=2.

In Step S304, the base station may further configure P1 channel measurement reference signals for Q threads, and the base station further configures P2 interference measurement resources for the Q threads, P1 and P2 being integers greater than 0.

A terminal selects Y threads from the Q threads, and performs CSI measurement and CSI feedback according to corresponding configurations of the Y threads, and Y<Q.

In addition, the terminal feeds selection information of the Y threads back to the base station, and Y may be 1.

In addition, the base station in the present alternative embodiment may further configure a CSI quantization and/or feedback method for the Q threads.

Herein, the operation that the base station configures a CSI quantization and/or feedback method for the Q CSI measurement threads includes at least one of the following: the base station configures a CQI calculation method for the Q threads; the base station configures a RANK or LAYER calculation method for the Q threads; the base station configures a used codebook quantization method for the Q threads; and the base station configures a CSI feedback mode for the Q threads.

In an embodiment, in the present alternative embodiment, the base station configures P1 sets of channel measurement reference signals for Q CSI measurement threads, and Q>=P1>1, and the P1 sets of reference signals are used for channel measurement on the Q CSI measurement threads.

The base station at least configures P2 sets of interference measurement resources for the Q CSI measurement threads, wherein Q>=P2>1, and the P2 sets of interference measurement resources are used for interference measurement on the Q CSI measurement threads.

On the basis of this, Q CSI measurement threads may correspond to the channel measurement reference signals and the interference measurement resources in the present alternative embodiment as follows:

channel measurement reference signals corresponding to the Q CSI measurement threads are the same, and interference measurement resources corresponding to at least two CSI measurement threads in the Q CSI measurement threads are different; or, interference resource measurement reference signals corresponding to the Q CSI measurement threads are the same, and interference measurement resources corresponding to at least two CSI measurement threads in the Q CSI measurement threads are different; or, at least two different types of reference signals (such as precoding reference signal/non-precoding reference signal) exist in the channel measurement reference signals corresponding to the Q CSI measurement threads.

At least X threads in the Q CSI measurement threads are used for channel information feedback of X RANK or LAYER groups respectively.

When X is 2:
a RANK or LAYER group 1 is RANK={1, 2} or LAYER={1, 2}, and a RANK or LAYER group 2 is RANK or LAYER={3, 4};

or a RANK or LAYER group 1 is RANK or LAYER={1, 2}, and a RANK or LAYER group 2 is RANK or LAYER={1, 2, 3, 4};

or, a RANK or LAYER group 1 is RANK or LAYER={1, 2}, and a RANK or LAYER group 2 is RANK or LAYER={3-8};

or, a RANK or LAYER group 1 is RANK or LAYER={1-4}, and a RANK or LAYER group 2 is RANK or LAYER={5-8};

or, a RANK or LAYER group 1 is RANK or LAYER={1-4}, and a RANK or LAYER group 2 is RANK or LAYER={1-8};

or, a RANK or LAYER group 1 is RANK or LAYER={1}, and a RANK or LAYER group 2 is RANK or LAYER={2} or RANK or LAYER={2-4} or {2-8} or {1-2} or {1-4} or {1-8};

when X is 3:
a RANK or LAYER group 1 is RANK or LAYER={1, 2}, a RANK or LAYER group 2 is RANK or LAYER={3, 4}, and a RANK or LAYER group 3 is RANK or LAYER={5-8};

a RANK or LAYER group 1 is RANK or LAYER={1, 2}, a RANK or LAYER group 2 is RANK or LAYER={1-4}, and a RANK or LAYER group 3 is RANK or LAYER={1-8};

a RANK or LAYER group 1 is RANK or LAYER={1}, a RANK or LAYER group 2 is {2}, and a RANK or LAYER group 2 is {3, 4};

a RANK or LAYER group 1 is RANK or LAYER={1}, a RANK or LAYER group 2 is {2}, and a RANK or LAYER group 2 is {3-8};

a RANK or LAYER group 1 is RANK or LAYER={1}, a RANK or LAYER group 2 is {2-4}, and a RANK or LAYER group 2 is {5, 8}.

It is important to note that thread parameters corresponding to a plurality of CSI processes may be independently configured, and thread number CQIs corresponding to the plurality of CSI processes may be configured respectively.

In addition, the present alternative embodiment also provides a CSI feedback method. The method will be described from the perspective of a terminal. The method includes the steps as follows.

The terminal obtains configuration information of Q CSI measurement threads corresponding to a CSI feedback process. Q>=2.

The configuration information of the Q CSI measurement threads at least includes: P1 channel measurement reference signals and P2 interference measurement resources, P1 and P2 being integers greater than 0.

The terminal selects Y threads from the Q CSI measurement threads, and performs CSI measurement and CSI feedback according to corresponding configurations of the Y threads, and Y<Q.

The terminal feeds selection information of the Y threads back to a base station, where Y=1.

In the present alternative embodiment, the configuration information of the Q CSI measurement threads further includes a CSI quantization and/or feedback method.

Herein, the CSI quantization method includes a CQI calculation method; the CSI feedback method includes a RANK or LAYER calculation method; the CSI quantization method includes a used codebook quantization method; and the CSI feedback method includes a CSI feedback mode.

In addition, the method in the present alternative embodiment further includes: performing channel measurement on the Q CSI measurement threads on the basis of P1 sets of channel measurement reference signals configured by the base station, and Q>=P1>1; and performing interference measurement on the Q CSI measurement threads on the basis of P2 sets of interference measurement resources configured by the base station, and Q>=P2>1.

Herein, channel measurement reference signals corresponding to the Q CSI measurement threads are the same, and interference measurement resources corresponding to at least two CSI measurement threads in the Q CSI measurement threads are different;

interference resource measurement reference signals corresponding to the Q CSI measurement threads are the same, and interference measurement resources corresponding to at least two CSI measurement threads in the Q CSI measurement threads are different; and at least two different types of reference signals (such as precoding reference signal/non-precoding reference signal) exist in the channel measurement reference signals corresponding to the Q CSI measurement threads.

It is important to note that at least X threads in the Q CSI measurement threads are used for channel information feedback of X RI groups respectively.

When X is 2:

a RANK or LAYER group 1 is RANK={1, 2} or LAYER={1, 2}, and a RANK or LAYER group 2 is RANK or LAYER={3, 4};

or a RANK or LAYER group 1 is RANK or LAYER={1, 2}, and a RANK or LAYER group 2 is RANK or LAYER={1, 2, 3, 4};

or, a RANK or LAYER group 1 is RANK or LAYER={1, 2}, and a RANK or LAYER group 2 is RANK or LAYER={3-8};

or, a RANK or LAYER group 1 is RANK or LAYER={1-4}, and a RANK or LAYER group 2 is RANK or LAYER={5-8};

or, a RANK or LAYER group 1 is RANK or LAYER={1-4}, and a RANK or LAYER group 2 is RANK or LAYER={1-8};

or, a RANK or LAYER group 1 is RANK or LAYER={1}, and a RANK or LAYER group 2 is RANK or LAYER={2} or RANK or LAYER={2-4} or {2-8} or {1-2} or {1-4} or {1-8};

when X is 3:

a RANK or LAYER group 1 is RANK or LAYER={1, 2}, a RANK or LAYER group 2 is RANK or LAYER={3, 4}, and a RANK or LAYER group 3 is RANK or LAYER={5-8};

a RANK or LAYER group 1 is RANK or LAYER={1, 2}, a RANK or LAYER group 2 is RANK or LAYER={1-4}, and a RANK or LAYER group 3 is RANK or LAYER={1-8};

a RANK or LAYER group 1 is RANK or LAYER={1}, a RANK or LAYER group 2 is {2}, and a RANK or LAYER group 2 is {3, 4};

a RANK or LAYER group 1 is RANK or LAYER={1}, a RANK or LAYER group 2 is {2}, and a RANK or LAYER group 2 is {3-8};

a RANK or LAYER group 1 is RANK or LAYER={1}, a RANK or LAYER group 2 is {2-4}, and a RANK or LAYER group 2 is {5, 8}.

By means of the manners described in the disclosure, various pieces of channel information can be measured through a plurality of threads, the terminal can be good in feedback flexibility, and the problems of bad robustness and poor performance during a single thread are avoided. Meanwhile, the feedback overheads are effectively controlled.

The present alternative embodiment is illustrated in detail hereinbelow by means of specific embodiments of the present alternative embodiment.

The present channel information feedback configuration method is described preferentially. The method includes the steps as follows.

In Step S301, a base station configures Q CSI measurement threads for a CSI feedback process.

Here, a CSI measurement thread corresponds to a set of CSI measurement configurations needed for completing CSI measurement, the configurations at least including configurations of a channel measurement part, configurations of a feedback measurement part, and other configurations of a feedback mode.

A CSI process in the related art is defined as follows. The CSI process (feedback resources allocated on the basis of a process contain only one CSI measurement thread) includes: a channel measurement part, an interference measurement part and other configurations.

The CSI process provided in the present alternative embodiment is defined as follows. The CSI process (feedback resources allocated on the basis of a process) includes: Q CSI measurement threads, each CSI measurement thread including a channel measurement part, an interference measurement part and other configurations.

Different from the definition of the CSI process in the related art, the CSI process in the related art may be interpreted as only including one process. The CSI process provided in the present alternative embodiment includes a plurality of threads, each thread needing to be configured or appointed with relevant configurations for corresponding channel measurement and interference measurement and feedback mode.

In Step S302, a terminal selects Y threads from the Q threads, and performs CSI measurement and CSI feedback according to corresponding configurations of the Y threads, and Y<Q.

Feedback resources are allocated on the basis of a process, so each thread does not definitely correspond to the feedback resources; and quantization results obtained by CSI measurement on some threads need to be fed back, but CSI measurement results corresponding to some threads do not need to be fed back.

The base station configures Q CSI measurement threads for the terminal. Here, the Q CSI measurement threads generally correspond to Q different quantization and/or feedback methods. Q is an integer greater than 1, so dynamic selection between various CSI measurements and feedbacks can be supported. However, in order to avoid over-high complexity, Q may be 2, 3 or 4 alternatively, and the value of Q may be configured for the base station by a pre-appointment between the base station and the terminal or by the base station through signaling. Here, the values of Q corresponding to different CSI processes may be independently configured.

Herein, the difference may be embodied in one of the following aspects: difference of the Q CSI measurement threads in channel measurement; difference of the Q CSI measurement threads in interference measurement; difference of the Q CSI measurement threads in CSI quantization method; difference of the Q CSI measurement threads in CSI feedback method; and difference of RANK or LAYER groups corresponding to the Q CSI measurement threads.

The method for configuring channel information in the present alternative embodiment will be illustrated with specific embodiments in different application scenarios hereinbelow.

Alternative embodiment 1: difference in channel measurement of each thread;

e.g., difference of configured measurement reference signals, here the difference of the measurement reference signals includes: different reference signal port numbers, different reference signal powers, different reference signal periods, different reference signal densities, different reference signal domain positions, different reference signal types and the like.

The difference of the measurement reference signals is illustrated as follows:

There are two CSI measurement threads, wherein

A) a port number configured for a thread 1 is $N_1$, and a port number configured for a thread 2 is $N_2$, where $N_1$ and $N_2$ are unequal positive integers;

B) a transmitting power configured for the thread 1 is Power 1, and a transmitting power configured for the thread 2 is Power 2, where Power 1 and Power 2 are unequal positive integers;

C) a reference signal period configured for the thread 1 is $T_1$, and a reference signal period configured for the thread 2 is $T_2$, where $T_1$ and $T_2$ are unequal positive integers;

D) $N_1$ reference signal REs are configured in a resource block for the thread 1, and $N_2$ reference signal REs are configured in a resource block for the thread 2, where $N_1$ and $N_2$ are unequal positive integers;

E) the type of a reference signal configured for the thread 1 is a beam reference signal, and the type of a reference signal configured for the thread 2 is a non beam reference signal;

F) a beam half-power density of the beam reference signal configured for the thread 1 is $W_1$, and a beam half-power density of the beam reference signal configured for the thread 2 is $W_2$, where $W_1$ and $W_2$ are unequal positive numbers;

G) an antenna set adopted for a transmitting reference signal of the thread 1 is $W_1$, and an antenna set adopted for a transmitting reference signal of the thread 2 is $W_2$, where $W_1$ and $W_2$ have at least one different element; and H) $N_1$ beams for forming the beam reference signal are configured for the thread 1, and $N_2$ beams for forming the beam reference signal are configured for the thread 2, where $N_1$ and $N_2$ are unequal positive integers.

The base station may configure the Q CSI measurement threads as fully-independent channel measurement. That is, Q sets of channel measurement reference signals are configured for the Q CSI measurement threads.

Or, the base station may configure the Q CSI measurement threads as partially-independent channel measurement. That is, less than Q sets of channel measurement reference signals are configured for the Q CSI measurement threads, namely at least two processes are configured with the same channel measurement reference signals.

Finally, it is important to note that identical channel measurement may also be achieved, but other different aspects are needed in this case.

Alternative embodiment 2: difference in interference measurement of each thread.

Difference of interference measurement resources involved in the present alternative embodiment 2 includes: different interference measurement RE numbers, different interference measurement positions, different interference measurement resource periods and the like.

The difference of the interference measurement resources is illustrated: two CSI measurement threads.

A) A port number configured for a thread 1 is $N_1$, and a port number configured for a thread 2 is $N_2$, where $N_1$ and $N_2$ are unequal positive integers.

B) A transmitting power configured for the thread 1 is Power 1, and a transmitting power configured for the thread 2 is Power 2, where Power 1 and Power 2 are unequal positive integers.

C) A reference signal period configured for the thread 1 is $T_1$, and a reference signal period configured for the thread 2 is $T_2$, where $T_1$ and $T_2$ are unequal positive integers.

D) $N_1$ reference signal REs are configured in a resource block for the thread 1, and $N_2$ reference signal REs are configured in a resource block for the thread 2, where $N_1$ and $N_2$ are unequal positive integers.

E) The type of a reference signal configured for the thread 1 is a beam reference signal, and the type of a reference signal configured for the thread 2 is a non beam reference signal.

F) A beam half-power density of the beam reference signal configured for the thread 1 is $W_1$, and a beam half-power density of the beam reference signal configured for the thread 2 is $W_2$, where $W_1$ and $W_2$ are unequal positive numbers.

G) An antenna set adopted for a transmitting reference signal of the thread 1 is $W_1$, and an antenna set adopted for a transmitting reference signal of the thread 2 is $W_2$, where $W_1$ and $W_2$ have at least one different element.

H) $N_1$ beams for forming the beam reference signal are configured for the thread 1, and $N_2$ beams for forming the beam reference signal are configured for the thread 2, where $N_1$ and $N_2$ are unequal positive integers.

The base station may configure the Q CSI measurement threads as fully-independent interference measurement. That is, Q sets of interference measurement reference signals are configured for the Q CSI measurement threads;

Or, the base station may configure the Q CSI measurement threads as partially-independent interference measurement. That is, less than Q sets of interference measurement reference signals are configured for the Q CSI measurement threads, namely at least two processes are configured with the same interference measurement reference signals.

Finally, it is important to note that identical interference measurement may also be achieved, but other different aspects are needed in this case.

Alternative embodiment 3: difference in CSI quantization methods of each thread.

A base station configures different CQI calculation methods for Q CSI measurement threads.

For example, a channel measurement reference signal of a thread i is a four-port CSI-RS, and on the basis of the four-port measurement reference signal, a terminal supposes that four ports perform transmission according to a transmission diversity technology, thus obtaining a transmission diversity CQI of the thread i. A channel measurement reference signal of a thread j is a two-port CSI-RS, and on the basis of the two-port measurement reference signal, the terminal supposes that two ports perform transmission according to a two-layer precoding technology, thus obtaining two corresponding CQIs.

Or, a channel measurement reference signal of a thread i is a four-port CSI-RS, and on the basis of the four-port measurement reference signal, a terminal supposes that four ports perform transmission according to a transmission diversity technology, thus obtaining a transmission diversity CQI of the thread i. A channel measurement reference signal of a thread j is a four-port CSI-RS, and on the basis of the four-port measurement reference signal, the terminal supposes that four ports perform transmission according to a four-layer precoding technology, thus obtaining two corresponding CQIs.

Or, a channel measurement reference signal of a thread i is a four-port CSI-RS, and on the basis of the four-port measurement reference signal, a terminal supposes that four ports perform transmission according to a transmission diversity technology, thus obtaining a transmission diversity CQI of the thread i. A channel measurement reference signal of a thread j is a four-port CSI-RS, and on the basis of the four-port measurement reference signal, the terminal performs port selection on the basis of the four ports, thus obtaining an optimum port and reporting a CQI corresponding to the port.

The base station configures different RANK or LAYER calculation methods for Q CSI measurement threads.

For example, the base station configures a RANK or LAYER of the thread i for the terminal, which is determined according to the number of ports in a corresponding CSI-RS reference signal or the number of ports in a DMRS (Demodulation Reference Signal) reference signal, and a RANK or LAYER of the thread j is determined by the base station according to a most suitable transmission layer of a current channel matrix H; generally, closed-loop precoding transmission is supposed, and the terminal traverses suppositions of all layers, compares performances of different transmission layers, and selects an optimum transmission layer.

The base station configures different codebook models for Q CSI measurement threads.

For example, a channel measurement reference signal of a thread i is a 16-port CSI-RS, a channel measurement reference signal of a thread j is the same CSI-RS, and a channel measurement reference signal of a thread k is also the same CSI-RS. The base station configures the terminal to perform quantized feedback on the threads i, j and k by using the following code word models 1, 2 and 3 respectively, and the model 1 is the thread i, the model 2 is the thread j, and the model 3 is the thread k.

$$\text{Model 1}\begin{bmatrix} v_0 & v_0 \\ \alpha v_0 & \alpha v_0 \\ \beta v_0 & -\beta v_0 \\ \alpha\beta v_0 & -\alpha\beta v_0 \end{bmatrix}$$

$$\text{Model 2}\begin{bmatrix} v_0 & v_0 \\ \alpha_1 v_0 & \alpha_2 v_0 \\ \beta_1 v_1 & \beta_2 v_1 \\ \alpha_1\beta_1 v_1 & \alpha_2\beta_2 v_1 \end{bmatrix}$$

$$\text{Model 3}\begin{bmatrix} v_0 & v_1 \\ \alpha_1 v_0 & \alpha_2 v_1 \\ \beta_1 v_0 & \beta_2 v_1 \\ \alpha_1\beta_1 v_0 & \alpha_2\beta_2 v_1 \end{bmatrix}$$

The base station configures different codebook feedback methods for Q CSI measurement threads.

For example, a channel measurement reference signal of a thread i is an eight-port CSI-RS, a channel measurement reference signal of a thread j is the same CSI-RS, and a channel measurement reference signal of a thread k is also the same CSI-RS. The base station configures the terminal to perform quantized feedback on the threads i, j and k by using the following codebook feedback methods respectively.

Thread i: an eight-antenna feedback method in an LTE-A Rel-10 version is used.

Thread j: two code word matrices D and W are fed back respectively on the basis of two codebooks, the code word matrix D is a diagonal matrix, which represents precoding amplitude information, and the code word matrix W is a unitary matrix and is a constant modulus matrix, which represents precoding phase information.

Thread k: various pieces of parameter information therein, including v0, v1, v2, v3, $\alpha_1$, $\alpha_2$, $\beta_1$, $\beta_2$, are fed back on the basis of the following model 4.

$$\text{Model 4}\begin{bmatrix} v_0 & v_2 \\ \alpha_1 v_0 & \alpha_2 v_2 \\ \beta_1 v_1 & \beta_2 v_3 \\ \alpha_1\beta_1 v_1 & \alpha_2\beta_2 v_3 \end{bmatrix}$$

The base station configures different codebook precisions for Q CSI measurement threads.

For example, a channel measurement reference signal of a thread i is a four-port CSI-RS, and a channel measurement reference signal of a thread j is the same CSI-RS. The base station configures the terminal to use two different precisions of codebooks for the threads i and j respectively.

Thread i: a 4 bit codebook is used, a codebook under each RANK or LAYER containing 16 code words.

Thread j: a 6 bit codebook is used, a codebook under each RANK or LAYER containing 64 code words.

For another example, a channel measurement reference signal of a thread i is an eight-port CSI-RS, and a channel measurement reference signal of a thread j is the same CSI-RS. The base station configures the terminal to use two different precisions of codebooks for the threads i and j respectively.

Thread i: a 6 bit codebook is used, a codebook under each RANK or LAYER containing 64 code words.

Thread j: an 8 bit codebook is used, a codebook under each RANK or LAYER containing 256 code words.

The base station configures different feedback parameters for Q CSI measurement threads.

A channel measurement reference signal of a thread i is a 16-port CSI-RS, a channel measurement reference signal of a thread j is the same CSI-RS, and a channel measurement reference signal of a thread k is also the same CSI-RS. The base station configures the terminal to perform quantized feedback on the threads i, j and k by using the following code word model 5.

$$\text{Model 5}\begin{bmatrix} v_0 & v_2 \\ \alpha_1 v_0 & \alpha_2 v_2 \\ \beta_1 v_1 & \beta_2 v_3 \\ \alpha_1\beta_1 v_1 & \alpha_2\beta_2 v_3 \end{bmatrix}$$

Thread i: the base station configures v0-v3, and the terminal performs quantized feedback on $\alpha_1$, $\alpha_2$, $\beta_1$, $\beta_2$.

Thread j: the base station configures $\alpha_1$, $\alpha_2$, $\beta_1$, $\beta_2$, and the terminal performs quantized feedback on v0-v3.

Thread k: the terminal performs quantized feedback on v0-v3 and $\alpha_1$, $\alpha_2$, $\beta_1$, $\beta_2$.

Alternative embodiment 4: difference in CSI feedback modes of each thread.

A channel measurement reference signal of a thread i is an eight-port non-precoding CSI-RS, and a channel measurement reference signal of a thread j is a two-port precoding CSI-RS. The following feedback contents are needed for the threads i and j configured for the terminal by the base station.

Thread i: a RANK or LAYER, a PMI and a CQI are reported.

Thread j: a RANK or LAYER and a CQI are reported.

Or, a channel measurement reference signal of a thread i is an eight-port non-precoding CSI-RS, and a channel measurement reference signal of a thread j is a two-port precoding CSI-RS. The following feedback contents are needed for the threads i and j configured for the terminal by the base station.

Thread i: a RANK or LAYER, a PMI and a CQI are reported.

Thread j: a CQI is reported.

Or, a channel measurement reference signal of a thread i is a four-port precoding CSI-RS, and a channel measurement reference signal of a thread j is a two-port precoding CSI-RS. The following feedback contents are needed for the threads i and j configured for the terminal by the base station.

Thread i: a RANK or LAYER, a CQI and port selection information are reported.

Thread j: a CQI is reported.

Or, a channel measurement reference signal of a thread i is a four-port precoding CSI-RS, and a channel measurement reference signal of a thread j is a two-port precoding CSI-RS. The following feedback contents are needed for the threads i and j configured for the terminal by the base station.

Thread i: a RANK or LAYER and a CQI are reported.

Thread j: a CQI is reported.

Alternative embodiment 5: difference of RANK or LAYER groups corresponding to each thread.

Herein, at least X threads in the Q CSI measurement threads are used for channel information feedback of X RANK or LAYER groups respectively.

When X is 2:

a RANK or LAYER group 1 is RANK or LAYER={1, 2}, and a RANK or LAYER group 2 is RANK or LAYER={3, 4};

or, a RANK or LAYER group 1 is RANK or LAYER={1}, and a RANK or LAYER group 2 is RANK or LAYER={2, 3, 4};

or, a RANK or LAYER group 1 is RANK or LAYER={1}, and a RANK or LAYER group 2 is RANK or LAYER={1-4};

or, a RANK or LAYER group 1 is RANK or LAYER={1}, and a RANK or LAYER group 2 is RANK or LAYER={2-8};

or, a RANK or LAYER group 1 is RANK or LAYER={1, 2}, and a RANK or LAYER group 2 is RANK or LAYER={1, 2, 3, 4};

or, a RANK or LAYER group 1 is RANK or LAYER={1, 2}, and a RANK or LAYER group 2 is RANK or LAYER={3-8};

or, a RANK or LAYER group 1 is RANK or LAYER={1-4}, and a RANK or LAYER group 2 is RANK or LAYER={5-8};

or, a RANK or LAYER group 1 is RANK or LAYER={1-4}, and a RANK or LAYER group 2 is RANK or LAYER={1-8};

when X is 3:

a RANK or LAYER group 1 is RANK or LAYER={1, 2}, a RANK or LAYER group 2 is RANK or LAYER={3, 4}, and a RANK or LAYER group 3 is RANK or LAYER={5-8};

or, a RANK or LAYER group 1 is RANK or LAYER={1, 2}, a RANK or LAYER group 2 is RANK or LAYER={1-4}, and a RANK or LAYER group 3 is RANK or LAYER={1-8};

or, a RANK or LAYER group 1 is RANK or LAYER={1, 2, 3}, a RANK or LAYER group 2 is RANK or LAYER={4, 5, 6}, and a RANK or LAYER group 3 is RANK or LAYER={7, 8};

when X is 4:

a RANK or LAYER group 1 is RANK or LAYER={1, 2}, a RANK or LAYER group 2 is RANK or LAYER={3, 4}, a RANK or LAYER group 3 is RANK or LAYER={5, 6}, and a RANK or LAYER group 4 is {7, 8};

or, a RANK or LAYER group 1 is RANK or LAYER={1, 2}, a RANK or LAYER group 2 is RANK or LAYER={1-4}, a RANK or LAYER group 3 is RANK or LAYER={5, 6}, and a RANK or LAYER group 4 is {5-8}.

Alternative embodiment 6: a terminal acquires Q CSI measurement threads configured by a base station.

The terminal receives configuration signaling of the base station, and acquires configurations of the Q CSI measurement threads therefrom, as shown in Table 2 and Table 3:

TABLE 2

| CSI process 1 | CSI measurement thread 1 | Reference signal port | 8 |
|---|---|---|---|
| | | Reference signal type | Non-precoding reference signal |
| | | IMR | Pattern 1 |
| | | Feedback content | RANK or LAYER/PMI/CQI |
| | | PMI feedback precision | 4bit/parameter |
| | | Feedback model | Code word model $\begin{bmatrix} v_0 & v_0 \\ \alpha_1 v_0 & \alpha_2 v_0 \\ \beta_1 v_1 & \beta_2 v_1 \\ \alpha_1\beta_1 v_1 & \alpha_2\beta_2 v_1 \end{bmatrix}$ |
| | | Number of code word parameters | 3 |
| | | ... | |
| | CSI measurement thread 2 | Reference signal port | 4 |
| | | Reference signal type | Precoding reference signal |
| | | IMR | Pattern 2 |
| | | Feedback content | CQI, port selection information |
| | | ... | |

TABLE 3

| CSI process 2 | CSI measurement thread 1 | Reference signal port | 16 |
|---|---|---|---|
| | | Reference signal type | Non-precoding reference signal |
| | | IMR | Pattern 1 |
| | | Feedback content | RI/PMI/CQI |
| | | PMI feedback precision | 4bit/parameter |

TABLE 3-continued

| | | Feedback model | Code word model |
|---|---|---|---|
| | | | $\begin{bmatrix} v_0 & v_2 \\ \alpha_1 v_0 & \alpha_2 v_2 \\ \beta_1 v_1 & \beta_2 v_3 \\ \alpha_1 \beta_1 v_1 & \alpha_2 \beta_2 v_3 \end{bmatrix}$ |
| | | Number of code word parameters | 3 |
| | | ... | |
| | CSI measurement thread 2 | Reference signal port | 16 |
| | | Reference signal type | Non-precoding reference signal |
| | | IMR | Pattern 1 |
| | | Feedback content | RI/PMI/CQI |
| | | PMI feedback precision | 3bit/parameter |
| | | Feedback model | Code word model |
| | | | $\begin{bmatrix} v_0 & v_2 \\ \alpha_1 v_0 & \alpha_2 v_2 \\ \beta_1 v_1 & \beta_2 v_3 \\ \alpha_1 \beta_1 v_1 & \alpha_2 \beta_2 v_3 \end{bmatrix}$ |
| | | Number of code word parameters | 4 |
| | | ... | |
| CSI process 3 | CSI measurement thread 1 | Reference signal port | 8 |
| | | Reference signal type | Non-precoding reference signal |
| | | IMR | Pattern 1 |
| | | Feedback content | RI/PMI/CQI |
| | | RI group | RI = 1-8 |
| | | Feedback model | Code word model |
| | | | $\begin{bmatrix} v_0 & v_2 \\ \alpha_1 v_0 & \alpha_2 v_2 \\ \beta_1 v_1 & \beta_2 v_3 \\ \alpha_1 \beta_1 v_1 & \alpha_2 \beta_2 v_3 \end{bmatrix}$ |
| | | Number of code word parameters | 3 |
| | | ... | |
| | CSI measurement thread 2 | Reference signal port | 2 |
| | | Reference signal type | Precoding reference signal |
| | | IMR | Pattern 2 |
| | | Feedback content | RI/PMI/CQI |
| | | RI group | RI = 1-8 |
| | | ... | |

It is important to note that various different configurations may be generated according to different application scenarios in combination with the above alternative embodiments 1-5.

Alternative embodiment 7: a terminal selects Y threads from Q CSI measurement threads for feedback.

The terminal performs CSI measurement quantization according to configurations of each thread to obtain a plurality of CSI measurement quantization results. The terminal may select one or more better results for feedback according to a criterion of maximum capacity.

The terminal may select one or more better results for feedback according to a criterion of maximum capacity. The terminal may also select one or more better results for feedback according to a criterion of highest quantization efficiency.

It is important to note that the terminal may also feed a CSI measurement thread corresponding to the above result back to a base station through an uplink channel.

By means of the present alternative embodiment, various pieces of channel information can be measured through a plurality of threads, the terminal can be good in feedback flexibility, and the problems of bad robustness and poor performance during a single thread are avoided, thus achieving the effect of effectively controlling the feedback overheads.

In another embodiment, software is also provided. The software is used to execute the technical solution described in the abovementioned embodiments and preferable implementation manners.

In another embodiment, a storage medium is also provided. The abovementioned software is stored in the storage medium. The storage medium includes, but is not limited to, an optical disk, a floppy disk, a hard disk, an erasable memory and the like.

Obviously, a person skilled in the art shall understand that all of the abovementioned modules or steps in the disclosure may be implemented by using a general calculation device, may be centralized on a single calculation device or may be distributed on a network composed of a plurality of calculation devices. Alternatively, they may be implemented by using executable program codes of the calculation devices. Thus, they may be stored in a storage device and executed by the calculation devices, the shown or described steps may be executed in a sequence different from this sequence under certain conditions, or they are manufactured into each integrated circuit module respectively, or multiple modules or steps therein are manufactured into a single integrated circuit module. Thus, the disclosure is not limited to a combination of any specific hardware and software.

The above is only the preferable embodiments of the disclosure, and not intended to limit the disclosure. As will occur to a person skilled in the art, the disclosure is susceptible to various modifications and changes. Any modifications, equivalent replacements, improvements and the like made within the spirit and principle of the disclosure shall fall within the scope of protection of the disclosure.

INDUSTRIAL APPLICABILITY

In the above implementation process of the embodiments of the disclosure, a mode of configuring Q CSI measurement threads for a CSI process and also configuring, by a base station, P1 channel measurement reference signals and P2 interference measurement resources for the Q CSI measurement threads is adopted. That is, various pieces of channel information can be measured by configuring multiple threads and configuring channel measurement reference signals and interference measurement resources for the multiple threads, thereby solving the problem in the related art where reference signal measurement and feedback technologies are not flexible.

What is claimed is:

1. A method for configuring channel information, comprising:
    configuring, by a base station, Q Channel State Information (CSI) measurement threads for a CSI process, wherein Q is an integer greater than or equal to 2; and
    configuring, by the base station, P1 channel measurement reference signals and P2 interference measurement resources for the Q CSI measurement threads, wherein the P1 channel measurement reference signals are used to perform channel measurement on the Q CSI measurement threads, and the P2 interference measurement resources are used to perform interference measurement on the Q CSI measurement threads, P1 and P2 being integers greater than zero;
    performing, by the terminal, CSI measurement and CSI feedback operations on the Q CSI measurement threads according to the P1 channel measurement reference signals and the P2 interference measurement resources, and selecting Y CSI measurement threads from the Q CSI measurement threads undergoing the CSI measurement and CSI feedback operations.

2. The method as claimed in claim 1, wherein channel measurement reference signals corresponding to the Q CSI measurement threads are the same, and interference measurement resources corresponding to at least two CSI measurement threads in the Q CSI measurement threads are different;
or, interference resource measurement reference signals corresponding to the Q CSI measurement threads are the same, and interference measurement resources corresponding to at least two CSI measurement threads in the Q CSI measurement threads are different.

3. The method as claimed in claim 1, wherein at least two different types of reference signals exist in the channel measurement reference signals corresponding to the Q CSI measurement threads.

4. The method as claimed in claim 1, further comprising:
configuring, by the base station, a CSI quantization and/or feedback way for the Q CSI measurement threads.

5. The method as claimed in claim 4, wherein configuring, by the base station, a CSI quantization and/or feedback way for the Q CSI measurement threads comprises:
configuring, by the base station, a channel RANK or LAYER calculation way for the Q CSI measurement threads; and/or,
configuring, by the base station, a Rank Indication (RI) calculation way for the Q CSI measurement threads; and/or,
configuring, by the base station, a used codebook quantization method for the Q CSI measurement threads; and/or,
configuring, by the base station, a CSI feedback mode for the Q CSI measurement threads.

6. The method as claimed in claim 5, wherein at least X CSI measurement threads in the Q CSI measurement threads are used for channel information feedback of X RANK or LAYER groups respectively.

7. The method as claimed in claim 6, wherein
when X is 2,
a RANK or LAYER group 1 is RANK or LAYER={1, 2}, and a RANK or LAYER group 2 is RANK or LAYER={3, 4}; or,
a RANK or LAYER group 1 is RANK or LAYER={1, 2}, and a RANK or LAYER group 2 is RANK or LAYER={1, 2, 3, 4}; or,
a RANK or LAYER group 1 is RANK or LAYER={1, 2}, and a RANK or LAYER group 2 is RANK or LAYER={3-8}; or,
a RANK or LAYER group 1 is RANK or LAYER={1-4}, and a RANK or LAYER group 2 is RANK or LAYER={5-8}; or,
a RANK or LAYER group 1 is RANK or LAYER={1-4}, and a RANK or LAYER group 2 is RANK or LAYER={1-8}; or,
a RANK or LAYER group 1 is RANK or LAYER={1}, and a RANK or LAYER group 2 is RANK or LAYER={2} or RANK or LAYER={2-4} or {2-8} or {1-2} or {1-4} or {1-8};
when X is 3,
a RANK or LAYER group 1 is RANK or LAYER={1, 2}, a RANK or LAYER group 2 is RANK or LAYER={3, 4}, and a RANK or LAYER group 3 is RANK or LAYER={5-8}; or,
a RANK or LAYER group 1 is RANK or LAYER={1, 2}, a RANK or LAYER group 2 is RANK or LAYER={1-4}, and a RANK or LAYER group 3 is RANK or LAYER={1-8}; or,
a RANK or LAYER group 1 is RANK or LAYER={1}, a RANK or LAYER group 2 is {2}, and a RANK or LAYER group 2 is {3, 4}; or,
a RANK or LAYER group 1 is RANK or LAYER={1}, a RANK or LAYER group 2 is {2}, and a RANK or LAYER group 2 is {3-8}; or,
a RANK or LAYER group 1 is RANK or LAYER={1}, a RANK or LAYER group 2 is {2-4}, and a RANK or LAYER group 2 is {5, 8}.

8. A channel information feedback method, comprising:
acquiring, by a terminal, configuration information of Q Channel State Information (CSI) measurement threads corresponding to a CSI process, wherein the configuration information comprises: P1 channel measurement reference signals and P2 interference measurement resources, the P1 channel measurement reference signals are used to perform channel measurement on the Q CSI measurement threads, and the P2 interference measurement resources are used to perform interference measurement on the Q CSI measurement threads, P1 and P2 being integers greater than zero; and
performing, by the terminal, CSI measurement and CSI feedback operations on the Q CSI measurement threads according to the P1 channel measurement reference signals and the P2 interference measurement resources, and selecting Y CSI measurement threads from the Q CSI measurement threads undergoing the CSI measurement and CSI feedback operations.

9. The method as claimed in claim 8, wherein channel measurement reference signals corresponding to the Q CSI measurement threads are the same, and interference measurement resources corresponding to at least two CSI measurement threads in the Q CSI measurement threads are different;
or, interference resource measurement reference signals corresponding to the Q CSI measurement threads are the same, and interference measurement resources corresponding to at least two CSI measurement threads in the Q CSI measurement threads are different.

10. The method as claimed in claim 8, wherein at least two different types of reference signals exist in the channel measurement reference signals corresponding to the Q CSI measurement threads.

11. The method as claimed in claim 8, wherein the configuration information is further used to instruct a base station to configure a CSI quantization and/or feedback way for the Q CSI measurement threads.

12. The method as claimed in claim 11, wherein the CSI quantization and/or feedback way comprises at least one of the following: a channel RANK or LAYER calculation way; a Rank Indication (RI) calculation way; a used codebook quantization method; and a CSI feedback mode.

13. The method as claimed in claim 12, wherein at least X CSI measurement threads in the Q CSI measurement threads are used for channel information feedback of X RANK or LAYER groups respectively.

14. The method as claimed in claim 13, wherein
when X is 2,
a RANK or LAYER group 1 is RANK={1, 2} or LAYER={1, 2}, and a RANK or LAYER group 2 is RANK or LAYER={3, 4}; or, a RANK or LAYER group 1 is RANK or LAYER={1, 2}, and a RANK or LAYER group 2 is RANK or LAYER={1, 2, 3, 4}; or, a RANK or LAYER group 1 is RANK or LAYER={1, 2}, and a RANK or LAYER group 2 is RANK or LAYER={3-8}; or, a RANK or LAYER group 1 is RANK or LAYER={1-4}, and a RANK or LAYER group 2 is RANK or LAYER={5-8}; or, a RANK or LAYER group 1 is RANK or LAYER={1-4}, and a RANK or LAYER group 2 is RANK or LAYER={1-8}; or, a RANK or LAYER group 1 is RANK or LAYER={1}, and a RANK or LAYER group 2 is RANK or LAYER={2} or RANK or LAYER={2-4} or {2-8} or {1-2} or {1-4} or {1-8};

when X is 3, a RANK or LAYER group 1 is RANK or LAYER={1, 2}, a RANK or LAYER group 2 is RANK or LAYER={3, 4}, and a RANK or LAYER group 3 is RANK or LAYER={5-8}; or, a RANK or LAYER group 1 is RANK or LAYER={1, 2}, a RANK or LAYER group 2 is RANK or LAYER={1-4}, and a RANK or LAYER group 3 is RANK or LAYER={1-8}; or, a RANK or LAYER group 1 is RANK or LAYER={1}, a RANK or LAYER group 2 is {2}, and a RANK or LAYER group 2 is {3, 4}; or, a RANK or LAYER group 1 is RANK or LAYER={1}, a RANK or LAYER group 2 is {2}, and a RANK or LAYER group 2 is {3-8}; or, a RANK or LAYER group 1 is RANK or LAYER={1}, a RANK or LAYER group 2 is {2-4}, and a RANK or LAYER group 2 is {5, 8}.

15. A device for configuring channel information, located at a base station, comprising:
   a first configuration module, configured to configure Q Channel State Information (CSI) measurement threads for a CSI process, wherein Q is an integer greater than or equal to 2; and
   a second configuration module, configured to configure P1 channel measurement reference signals and P2 interference measurement resources for the Q CSI measurement threads, wherein the P1 channel measurement reference signals are used to perform channel measurement on the Q CSI measurement threads, and the P2 interference measurement resources are used to perform interference measurement on the Q CSI measurement threads, P1 and P2 being integers greater than zero.

16. The device as claimed in claim 15, wherein channel measurement reference signals corresponding to the Q CSI measurement threads are the same, and interference measurement resources corresponding to at least two CSI measurement threads in the Q CSI measurement threads are different;
   or, interference resource measurement reference signals corresponding to the Q CSI measurement threads are the same, and interference measurement resources corresponding to at least two CSI measurement threads in the Q CSI measurement threads are different.

17. The device as claimed in claim 15, wherein at least two different types of reference signals exist in the channel measurement reference signals corresponding to the Q CSI measurement threads.

18. The device as claimed in claim 15, further comprising:
   a third configuration module, configured to configure a CSI quantization and/or feedback way for the Q CSI measurement threads.

19. A channel information feedback device, located at a terminal, comprising:
   an acquisition module, configured to acquire configuration information of Q Channel State Information (CSI) measurement threads corresponding to a CSI process, wherein the configuration information comprises: P1 channel measurement reference signals and P2 interference measurement resources, the P1 channel measurement reference signals are used to perform channel measurement on the Q CSI measurement threads, and the P2 interference measurement resources are used to perform interference measurement on the Q CSI measurement threads, P1 and P2 being integers greater than zero; and
   a selection module, configured to execute, by the terminal, CSI measurement and CSI feedback operations on the Q CSI measurement threads according to the P1 channel measurement reference signals and the P2 interference measurement resources, and select Y CSI measurement threads from the Q CSI measurement threads undergoing the CSI measurement and CSI feedback operations.

20. The device as claimed in claim 19, wherein channel measurement reference signals corresponding to the Q CSI measurement threads are the same, and interference measurement resources corresponding to at least two CSI measurement threads in the Q CSI measurement threads are different;
   or, interference resource measurement reference signals corresponding to the Q CSI measurement threads are the same, and interference measurement resources corresponding to at least two CSI measurement threads in the Q CSI measurement threads are different.

* * * * *